(12) United States Patent
Takezawa

(10) Patent No.: US 9,195,918 B2
(45) Date of Patent: Nov. 24, 2015

(54) LIGHT SCANNING DEVICE CAPABLE OF EXECUTING AUTOMATIC LIGHT AMOUNT CONTROL AND IMAGE FORMING APPARATUS EQUIPPED WITH THE SAME

(75) Inventor: Satoru Takezawa, Abiko (JP)

(73) Assignee: CANON KABUSHIKI KAISHA (JP)

( * ) Notice: Subject to any disclaimer, the term of this patent is extended or adjusted under 35 U.S.C. 154(b) by 915 days.

(21) Appl. No.: 13/358,094

(22) Filed: Jan. 25, 2012

(65) Prior Publication Data

US 2012/0188328 A1 Jul. 26, 2012

(30) Foreign Application Priority Data

Jan. 26, 2011 (JP) ................................ 2011-014041

(51) Int. Cl.
*G06K 15/12* (2006.01)

(52) U.S. Cl.
CPC .................................. *G06K 15/1209* (2013.01)

(58) Field of Classification Search
CPC ............ B41J 2/455; B41J 2/435; B41J 2/471; G03G 15/043; G03G 15/04054; G06K 15/1209
See application file for complete search history.

(56) References Cited

U.S. PATENT DOCUMENTS

2009/0190943 A1* 7/2009 Yamashita ...................... 399/51
2012/0148277 A1* 6/2012 Takezawa ...................... 399/51

FOREIGN PATENT DOCUMENTS

JP 2002-040350 A 2/2002

* cited by examiner

*Primary Examiner* — Sarah Al Hashimi
(74) *Attorney, Agent, or Firm* — Rossi, Kimms & McDowell LLP

(57) ABSTRACT

A light scanning device that performs rapid scanning synchronization timing detection to thereby enable automatic light amount control to be executed rapidly and with high accuracy. A light amount sensor disposed on a scanning line of the laser light receives the laser light. A controller controls the timing of emission by the laser emitting device and a light amount of the laser light based on image data, according to an output from the light amount sensor. A temperature sensor detects the temperature of the laser emitting device or in the light scanning device. A storage section stores data indicative of a relationship between temperature, current supplied to the laser emitting device, and light amount. A controller controls current to be supplied to the laser emitting device based on temperature detected by the temperature detecting unit and data stored in the storage section.

6 Claims, 8 Drawing Sheets

FIG.6

| TEMPERATURE | LIGHT AMOUNT | CURRENT |
|---|---|---|
| T5 | P1 | IT5P1 |
|  | P2 | IT5P2 |
|  | P3 | IT5P3 |
|  | P4 | IT5P4 |
| T10 | P1 | IT10P1 |
|  | P2 | IT10P2 |
|  | P3 | IT10P3 |
|  | P4 | IT10P4 |
|  |  |  |
| ..... | ..... | ..... |
|  |  |  |
| T35 | P1 | IT35P1 |
|  | P2 | IT35P2 |
|  | P3 | IT35P3 |
|  | P4 | IT35P4 |

LIGHT SCANNING DEVICE CAPABLE OF EXECUTING AUTOMATIC LIGHT AMOUNT CONTROL AND IMAGE FORMING APPARATUS EQUIPPED WITH THE SAME

BACKGROUND OF THE INVENTION

1. Field of the Invention

The present invention relates to a light scanning device that deflects and scans a plurality of light beams on a photosensitive member e.g. of a laser printer, and an image forming apparatus that performs image formation using the light scanning device.

2. Description of the Related Art

In general, electrophotographic image forming apparatuses include e.g. a laser printer that performs image formation by scanning laser light on a photosensitive drum. In such a laser printer, a scanning optical system is used in which laser light emitted from a laser emitting device is collected by a lens system, and is deflected and scanned by a polygon mirror along with the rotation of a scanner motor.

In this laser printer, to adapt the printer to faster printing speed and higher resolution, there has been proposed a technique of performing image formation by increasing the number of laser emitting devices and simultaneously scanning a plurality of laser light beams. For example, when a surface emitting laser (hereinafter also referred to as VCSEL: vertical cavity surface emitting laser) is used, it is easy to form emission spots into an array and it is possible to configure the array such that a lot of emission spots are arranged on one chip.

By the way, some laser printers perform automatic light amount control (hereinafter also referred to as APC: automatic power control) in order to maintain the light amount of a laser light beam on a scanning surface at a constant level during image formation. In one method of APC, a laser is lit for a predetermined time period and a light amount of emitted laser light is detected by a light amount-detecting unit (PD: photodiode) which is internally or externally provided for the laser, for performing light detection, whereby current for driving the laser is feedback-controlled according to the detected light amount.

In this method of APC, the photodiode detects laser light (rear light) emitted from an edge (end face) of a laser emitting device opposite from a laser emitting edge thereof. Timing of execution of APC is during scanning of the laser light beam through a non-image area outside an image area on a photosensitive member. This makes it possible to perform APC without affecting the image formation.

Further, in a scanning optical system that scans a plurality of beams, it is difficult to have the same number of photodiodes as the number of laser elements in association with the respective beams because of difficulty of arrangement thereof. Even if the same number of photodiodes can be arranged, this increases costs. To cope with this inconvenience, some scanning optical systems that scan a plurality of beams are configured such that a plurality of beams are received by a single photodiode, and a plurality of laser elements are sequentially lit for execution of APC, whereby the light amount is controlled on a laser element-by-laser element basis.

In the case of the VCSEL or the like of which the number of laser emission spots can be easily increased, however, the direction of emitting laser light beams is perpendicular to a semiconductor substrate, and hence it is difficult to arrange the photodiodes within the same package as in a semiconductor laser that emits light from its edge (end face).

To overcome this problem, in the case of the VCSEL or the like, there has been proposed a method in which light output from the front surface is separated by a half mirror to cause the same to enter a photodiode, whereby APC is performed using the single photodiode (see e.g. Japanese Patent Laid-Open Publication No. 2002-40350).

This method separates a light flux passed through an aperture which narrows down collimated light from a collimator lens that collimates light emitted from a surface emitting laser, into light going to a photosensitive member and light going to a photodiode, and performs APC using the single photodiode.

However, when APC is performed for a laser emitting device, such as a VCSEL, from which rear light cannot be detected, there arises the following problem:

When a VCSEL is used as a laser emitting device, APC cannot be performed without detecting light (front light) going to a photosensitive drum. For this reason, when the VCSEL is used, the amount of front light is adjusted by progressively increasing the same up to an amount at which a synchronization signal can be generated, thereafter, a non-image area is detected using the synchronization signal, and APC is performed in the detected non-image area.

However, in the VCSEL, the light amount is varied by influence of temperature on drive current, as shown in FIG. 3. Therefore, if the VCSEL has temperature characteristics as indicated by T2 in FIG. 3, it takes a long time before the amount of front light is adjusted to the amount at which the synchronization signal can be generated, by progressively increasing the value of current from a bias current value.

SUMMARY OF THE INVENTION

The present invention provides a light scanning device that is capable of performing rapid scanning synchronization timing detection to thereby make it possible to perform automatic light amount control rapidly and with high accuracy, and can be manufactured at low costs, and an image forming apparatus including the light scanning device.

In a first aspect of the present invention, there is provided a light scanning device that forms an electrostatic latent image on a photosensitive member by deflecting laser light emitted from a laser emitting device such that the laser light scans on the photosensitive member in a predetermined direction, comprising a light receiving unit disposed on a scanning line of the laser light, for receiving the laser light, a temperature detecting unit configured to detect a temperature of the laser emitting device or an inside of the light scanning device, a storage unit configured to store data indicative of a relationship between the temperature, drive current to be supplied to the laser emitting device, and a light amount of the laser light, and a current control unit configured to control the drive current to be supplied to the laser emitting device based on the temperature detected by the temperature detecting unit and the data stored in the storage unit, such that an output level of an output from the light receiving unit responsive to receipt of the laser light at the start of scanning of the laser light is not lower than a predetermined output level at which timing of emission of the laser light can be controlled, and is not higher than an output level corresponding to a maximum allowable amount of the laser light to be emitted by the laser emitting device.

In a second aspect of the present invention, there is provided an image forming apparatus comprising a laser emitting device configured to emit laser light, a photosensitive member configured to have an electrostatic latent image formed thereon by the laser light emitted from the laser emitting device, and a light scanning device configured to form the electrostatic latent image on the photosensitive member by deflecting the laser light emitted from the laser emitting device such that the laser light scans on the photosensitive member in a predetermined direction, wherein the light scanning device comprises a light receiving unit disposed on a scanning line of the laser light, for receiving the laser light, a temperature detecting unit configured to detect a temperature of the laser emitting device or an inside of the light scanning device, a storage unit configured to store data indicative of a relationship between the temperature, drive current to be supplied to the laser emitting device, and a light amount of the laser light, and a current control unit configured to control the drive current to be supplied to the laser emitting device based on the temperature detected by the temperature detecting unit and the data stored in the storage unit, such that an output level of an output from the light receiving unit responsive to receipt of the laser light at the start of scanning of the laser light is not lower than a predetermined output level at which timing of emission of the laser light can be controlled, and is not higher than an output level corresponding to a maximum allowable amount of the laser light to be emitted by the laser emitting device.

According to the light scanning device of the present invention and the image forming apparatus provided with the same, it is possible to obtain advantageous effects that rapid scanning synchronization timing detection is performed thereby enabling the automatic light amount control to be executed rapidly and with high accuracy, and the light scanning device and the image forming apparatus can be manufactured at low costs. Further, for example, even for a laser that cannot perform APC using rear light as in an edge emitting laser, it is possible to perform APC with high accuracy by performing APC directly on the scanning light without being affected by the optical system. Further, for example, it is possible to manufacture the light scanning device at low costs by simplifying the configuration because a half mirror is not used, and it is possible to reduce the size of the light scanning device since a space for a half mirror can be saved.

Further features of the present invention will become apparent from the following description of exemplary embodiments with reference to the attached drawings.

BRIEF DESCRIPTION OF THE DRAWINGS

FIG. 6 is a table showing parameters of a temperature, a current value, and a light amount, as characteristics of the laser emitting device used in the light scanning device according to the embodiment.

DESCRIPTION OF THE EMBODIMENTS

The present invention will now be described in detail below with reference to the accompanying drawings showing embodiments thereof.

Figure 1:
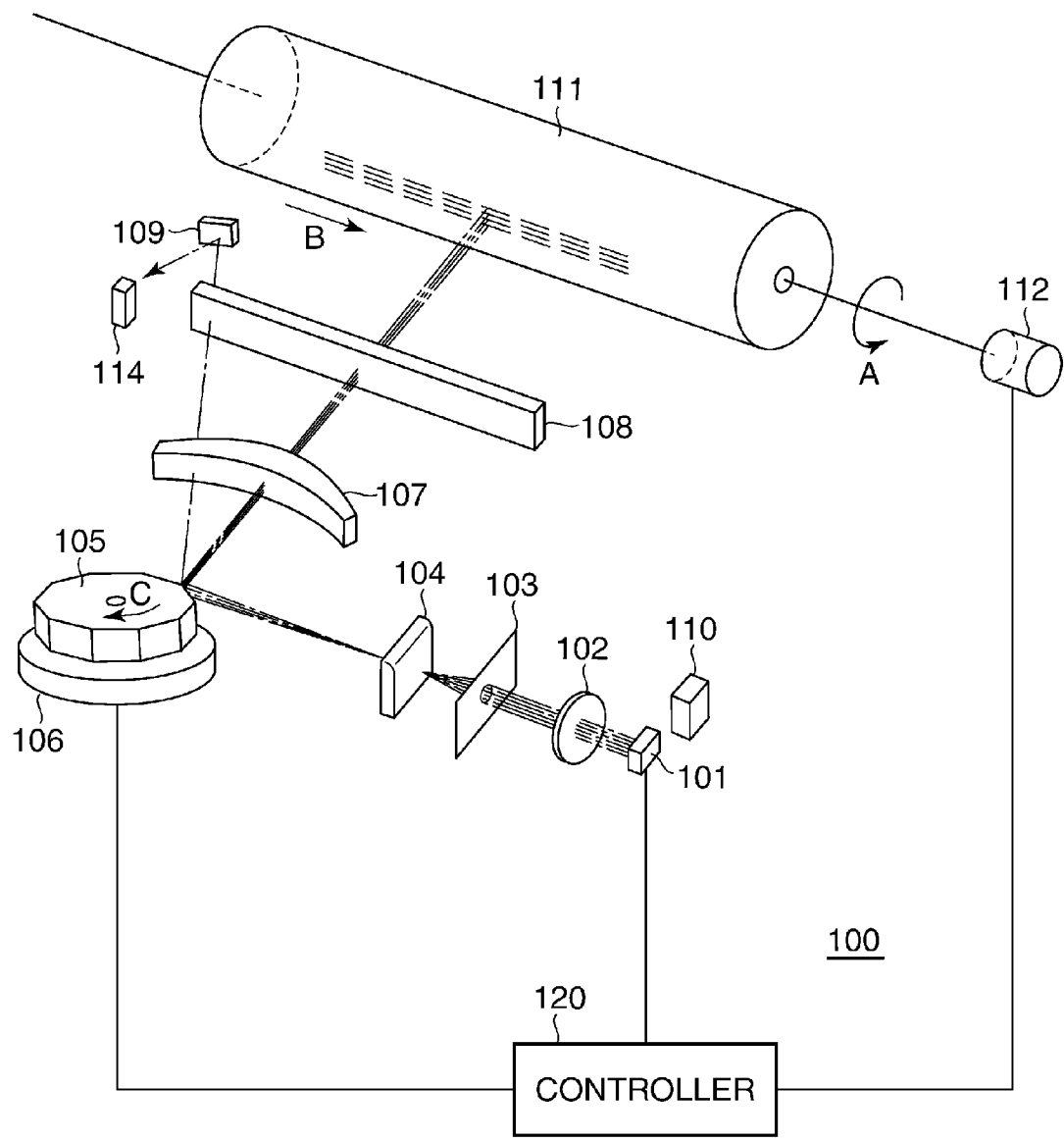
FIG. 1 is a schematic perspective view useful in explaining the arrangement of a light scanning device according to an embodiment of the present invention.

FIG. 1 schematically shows the arrangement of a light scanning device used in an image forming apparatus according to the present embodiment, and reference numeral 100 denotes the entire light scanning device. The light scanning device 100 includes a laser emitting device 101, a collimator lens 102, an aperture diaphragm 103, a cylindrical lens 104, a polygon mirror 105, a scanner motor 106, a toric lens 107, and a diffraction optical element 108. The light scanning device 100 further includes a reflective mirror 109, a light amount sensor (PD sensor for light amount detection) 114, a temperature sensor 110, and a controller 120. The controller 120 functions as an emission control unit that controls the light emission timing and light amount of laser light to be emitted from the laser emitting device 101 based on image data, according to an output from the light amount sensor 114.

Figure 2:
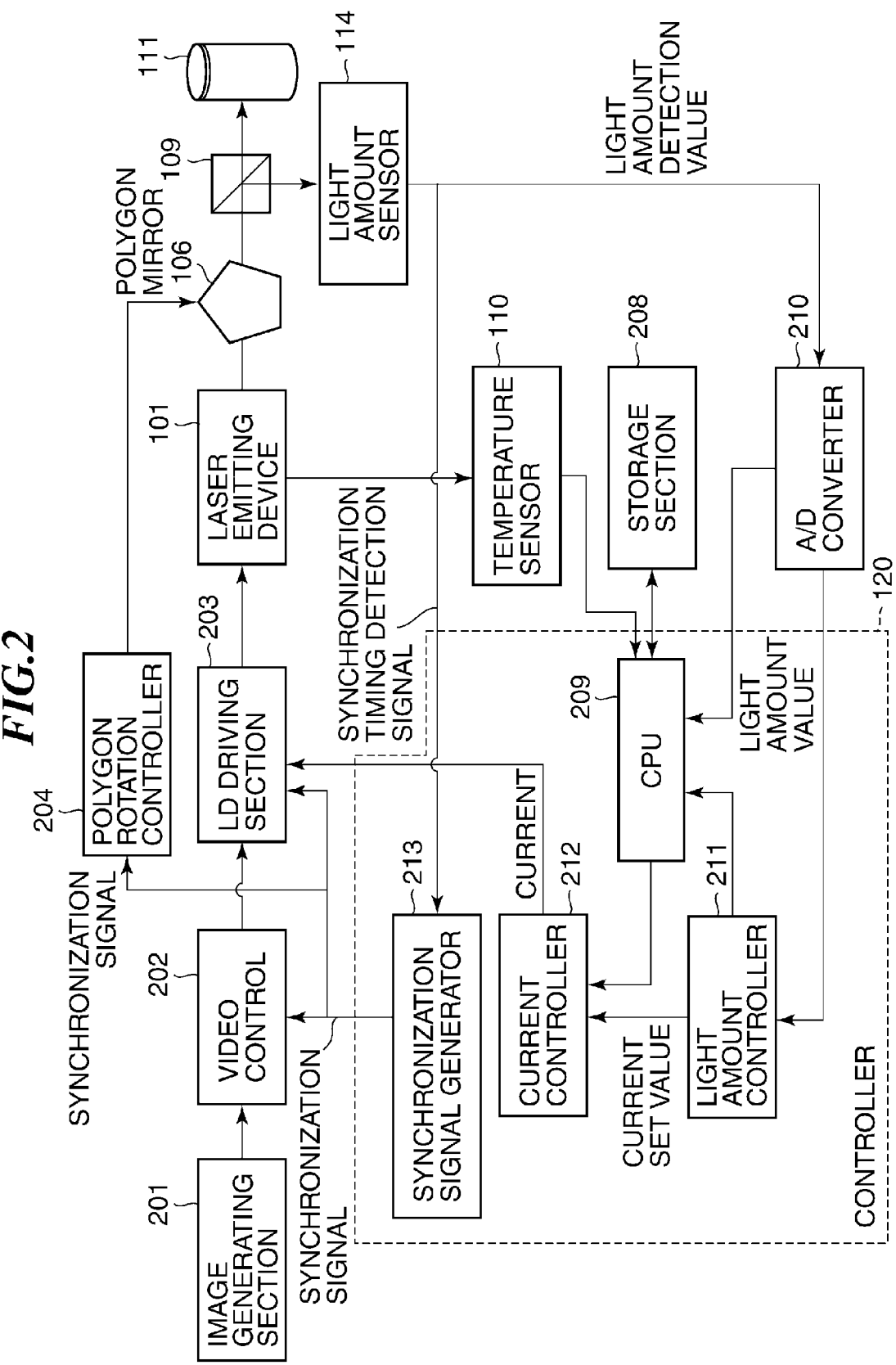
FIG. 2 is a schematic block diagram of an image forming apparatus including the light scanning device according to the embodiment.

The controller 120 selects data associated with a temperature nearest to a temperature detected by the temperature sensor 110 from a plurality of data items stored in a storage section 208 (see FIG. 2). Further, the controller 120 functions as a current control unit that controls current supplied to the laser emitting device 101 based on the data, such that a level of output from the light amount sensor 114 responsive to receipt of laser light is equal to or higher than a predetermined output level which enables control of emission timing, at the start of scanning of the laser light, and that the output level is not higher than an output level corresponding to a maximum allowable light emission amount from the laser emitting device 101.

The laser emitting device 101 used in the light scanning device 100 is a vertical cavity surface emitting laser diode (also referred to as the VCSEL in the present specification). The laser emitting device 101 emits laser light perpendicularly from a laser emitting surface thereof, and hence cannot perform APC using rear light emitted from a side opposite from the laser emitting surface differently from an edge emitting laser.

However, when the present laser emitting device 101 is used, it is possible to form a plurality of main scanning lines in a single main scan, and hence it is possible to reduce the rotational speed of the polygon mirror 105. Conversely, when the rotational speed is not reduced, it is possible to form an image at high speed.

The light beams emitted from the laser emitting device 101 are converted to a collimated light flux when passing through the collimator lens 102, and then the collimated light flux passes through the aperture diaphragm 103. At this time, the light flux of the light beams is limited and adjusted.

The light beams having passed through the aperture diaphragm 103 travel toward the cylindrical lens 104. The cylindrical lens 104 has a predetermined refracting power only in a sub scanning direction, and causes the light flux having passed through the aperture diaphragm 103 to form an image as a line image in the main scanning direction on a reflecting surface of the polygon mirror 105.

The polygon mirror (light deflector) 105 is rotated by the scanner motor 106 at a constant speed in a direction indicated by an arrow C in FIG. 1 for deflecting and scanning the laser light forming the image on the reflecting surface, whereby the laser light travels toward the toric lens 107.

The toric lens 107 is an optical element having fθ characteristics, and is configured as a refraction section having refractive indexes different between the main scanning direction and the sub scanning direction. The lens surfaces on opposite sides of the toric lens 107 in the main scanning direction are each formed into an aspheric shape. After passing through the toric lens 107 to undergo refraction, the light flux travels toward the diffraction optical element 108.

The diffraction optical element 108 is an optical element having fθ characteristics, and is configured as a long diffraction section having diffraction powers different between the main scanning direction and the sub scanning direction. The light flux diffracted by passing through the diffraction optical element 108 travels toward a photosensitive drum (onto a photosensitive member) 111 provided for the image forming apparatus.

In the present light scanning device 100, the light amount sensor 114 is disposed at a location corresponding to an area (non-image area) outside an image area for forming an image on an exposed surface of the photosensitive drum 111. The light amount sensor 114 is disposed on a scanning line of laser light, and forms a light receiving unit which receives laser light emitted from the laser emitting device 101 during a time period, as part of one scan period of laser light, which is other than during scanning of the laser light on the photosensitive member.

Further, in the present light scanning device 100, the reflective mirror 109 is disposed at a location where is received the light flux diffracted by the diffraction optical element 108 and output toward the photosensitive drum 111 for starting the main scanning. Further, the present light scanning device 100 is configured such that the light flux reflected from the reflective mirror 109 enters a laser light detection surface of the light amount sensor 11.

In the light scanning device 100 configured as above, main scanning by the polygon mirror 105 causes respective spots of a plurality of laser light beams emitted from the laser emitting device 101 to irradiate the exposed surface of the photosensitive drum 111 such that the laser spots are linearly moved on the exposed surface of the photosensitive drum 111 in an axial direction. By doing this, a belt-like electrostatic latent image having a predetermined width is written on the exposed surface of the photosensitive drum 111 by a single main scan. The photosensitive drum 111 is driven for rotation by a drive unit 112 under the control of the controller 120, whereby while the photosensitive drum 111 is moved i.e. rotated in the sub scanning direction, writing of an electrostatic latent image by main scanning is repeated, so as to perform exposure for the entire image.

Next, a description will be given of essential parts of a control system of the image forming apparatus including the light scanning device according to the present embodiment, with reference to FIG. 2. Note that the controller 120 appearing in FIG. 1 comprises a CPU 209, a light amount controller 211, a current controller 212, and a synchronization signal generator 213 appearing in FIG. 2.

In the present image forming apparatus, for example, when copying is performed, an image generating section 201 scans an image to be printed by a scanner, not shown, under the control of the CPU 209, and performs image processing on the scanned image to thereby generate image data for printing.

The image data generated by the image generating section 201 is delivered to a video control 202 where the main scanning timing and the sub scanning timing are controlled, and then the video control 202 inputs the image data to an LD (laser diode) driving section 203 at a predetermined timing. Note that the main scanning and the sub scanning are performed with reference to a synchronization signal from the synchronization signal generator 213.

The LD driving section 203 having received the image data modulates the image data into a modulated video signal according to a predetermined light amount, and delivers current to the laser emitting device 101 such that emission of laser light is performed according to the modulated video signal. In doing this, the current controller 212 controls the current such that the laser can be lit with the predetermined light amount.

Along with this, the CPU 209 drivingly controls the scanner motor 106 to rotate the polygon mirror 105 having a plurality of mirror surfaces (reflecting surfaces). Note that the scanner motor 106 is controlled such that the rotational speed thereof matches the sub scanning timing. For this reason, a polygon rotation controller 204 controls the rotational speed of the polygon mirror 105 using the synchronization signal from the synchronization signal generator 213 such that the modulated video signal and the main scanning timing match each other.

The polygon mirror 105 is controlled for rotation as mentioned above, whereby the laser light emitted from the laser emitting device 101 is scanned and irradiated onto the photosensitive drum 111. At this time, part of the laser light emitted from the laser emitting device 101 is scanned by the polygon mirror 105 to pass through the toric lens 107 and the diffraction optical element 108, then reflected by the reflective mirror 109, and detected by the light amount sensor 114. Note that the mirror 109 is disposed at an end of the scanning light pathway along an axial direction of the photosensitive drum 111, and hence most of the scanning laser light is irradiated onto the photosensitive drum.

Further, in this light scanning device, the temperature sensor 110 is disposed in the vicinity of the laser emitting device 101 to detect the temperature of the laser emitting device 101. The temperature sensor 110 may be configured to determine the temperature indirectly by estimating the temperature of the laser emitting device 101 from the temperature in the vicinity of the laser emitting device 101 or the temperature of a surrounding member in a case where the temperature of the laser emitting device 101 cannot be directly detected. The temperature sensor 110 may be configured to detect not the temperature of the laser emitting device 101 itself, but the internal temperature of the light scanning device provided with the laser emitting device 101. In this case, it is preferable to dispose the temperature sensor 110 in a predetermined place within the light scanning device where the temperature varies in a manner following variation in the temperature of the laser emitting device 101 itself.

A value of the temperature detected by the temperature sensor 110 is delivered to the CPU 209, and then is stored in the storage section 208 which is of a rewritable type. Further, the storage section 208 also stores a value of the light amount adjusted according to an output from the light amount sensor 114 at initial APC. The storage section 208 further stores results of detection of the temperature (detected temperature values) of the laser emitting device 101, values of current supplied to the laser emitting device 101, and light amounts as a table of data.

The data stored in the storage section 208, including the detected temperature values, the current values, and the light amounts, is used by the CPU 209 so as to perform laser driving control. For the purpose of enabling the light amount sensor 114 to detect laser scanning synchronization timing for automatic light amount control (APC) at the start of laser scanning, the CPU 209 as a light amount-determining unit calculates, based on a detected temperature value detected by the temperature sensor 110, an amount of current for adapting the amount of light emitted from the laser emitting device 101 to a target light amount. More specifically, the CPU 209 calculates the amount of current for causing the amount of light emitted from the laser emitting device 101 to reach the target light amount, by consulting the relationship between the detected temperature value, the light amount, and the current value, according to the detected temperature value detected by the temperature sensor 110. Then, the CPU 209 delivers the calculated current value to the current controller 212, and starts the laser driving when the light amount control is started with the automatic light amount control (APC) by controlling the drive current based on the delivered current value. The calculation method will be described hereinafter.

Next, a description will be given of correction data for calculating the current value in the laser driving control at the start of laser scanning.

First, a description will be given of individual parameters for determining the current value at the start of laser scanning based on the relationship between the current value, the detected temperature value, and the light amount, which is stored in the storage section 208, with reference to FIG. 3.

Figure 3:
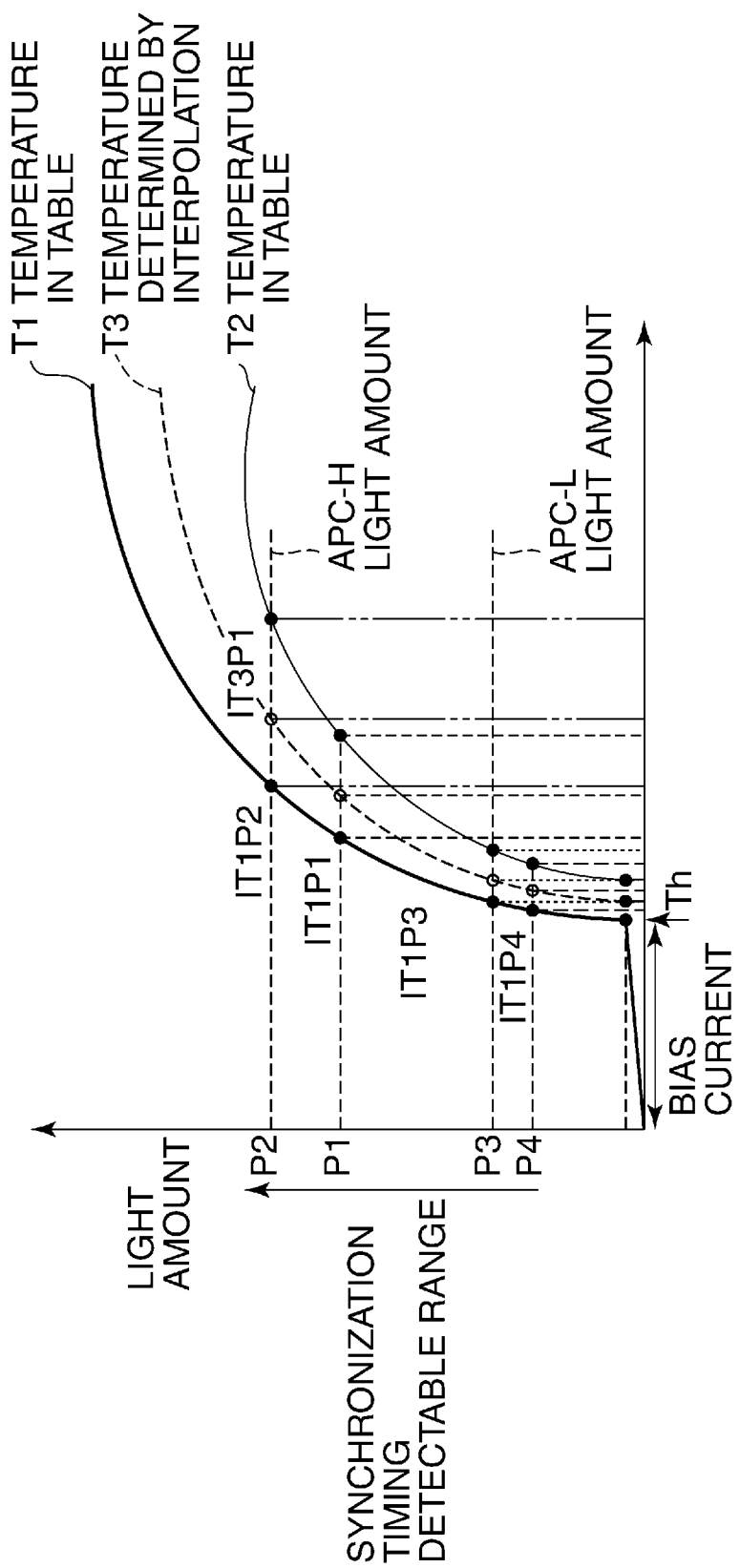
FIG. 3 is a graph useful in explaining a relationship between parameters of a light amount detected from a laser emitting device, current supplied to the laser emitting device, and temperature detected of the laser emitting device, based on which a value of the current to be supplied to the laser emitting device is determined at the start of laser scanning.

FIG. 3 shows the relationship between the value of current supplied to the laser emitting device 101 and the amount of laser light to be output. Among the data items of current values, detected temperature values, and light amounts, which are stored in the storage section 208, it is assumed, for example, that a current value for outputting a light amount P1 at a temperature T1 is indicated by IT1P1.

Further, P1 represents a target value of a light amount for initial APC, for use in detecting laser scanning synchronization timing. P2 represents an APC-H light amount which is the maximum value of the light amount required by design. P4 represents a minimum light amount which enables detection of the synchronization timing, and if the light amount is lower than P4, a waveform level is low, and a data curve representative of a rise and fall of a signal becomes flat, which results in inaccurate detection of the synchronization timing.

Further, P3, which is equal to a fraction of P2 (APC-H light amount), represents an APC-L light amount as a smallest value of the light amount for the automatic light amount control, which corresponds to a lower limit of drive current for use in detecting the synchronization timing. Th indicates a threshold value at which laser output is started when the value of current to be supplied to the laser emitting device 101 is increased from a value of 0. Note that before lighting the laser, a bias current corresponding to several tens % of the threshold value is supplied to the laser emitting device 101 to thereby prevent laser emission delay.

Before factory shipment, as the typical characteristics of the laser emitting device 101, the light amount P1, the temperature T1, and the current values IT1P1, IT1P2, IT1P3, and IT1P4 are stored as one set in the storage section 208. More specifically, as shown in FIG. 6, the above-mentioned one set of parameters include the light amounts P2 to P4 corresponding to each of temperature values at predetermined value intervals, and respective current values for outputting the light amounts P2 to P4, and these values are stored in the storage section 208 as a table of stored values. The temperature T1 is an initial operation temperature for use in calculating current in a first operation after factory shipment. Note that these data items are values specific to an individual product of the laser emitting device 101, and hence are measured and detected in advance.

As is clear from the relationship between the current and the light amount at the temperatures T2 and T3 which are different from the temperature T1 shown in the FIG. 3 graph, the laser emitting device 101 has characteristics that a light emission efficiency is largely different depending on the temperature. Here, the temperatures have a relationship of T1<T3<T2.

Before factory shipment, the typical characteristics of the laser emitting device 101 are stored in the storage section 208 as the table of the stored values, as mentioned above. In the present light scanning device, data of the stored values in the table, which include those of the temperature, the light amount, and the current values, is updated and stored in the storage section 208 at required timing in order to cope with variation in the characteristics of the laser emitting device 101 and aging of the same.

Figure 4:
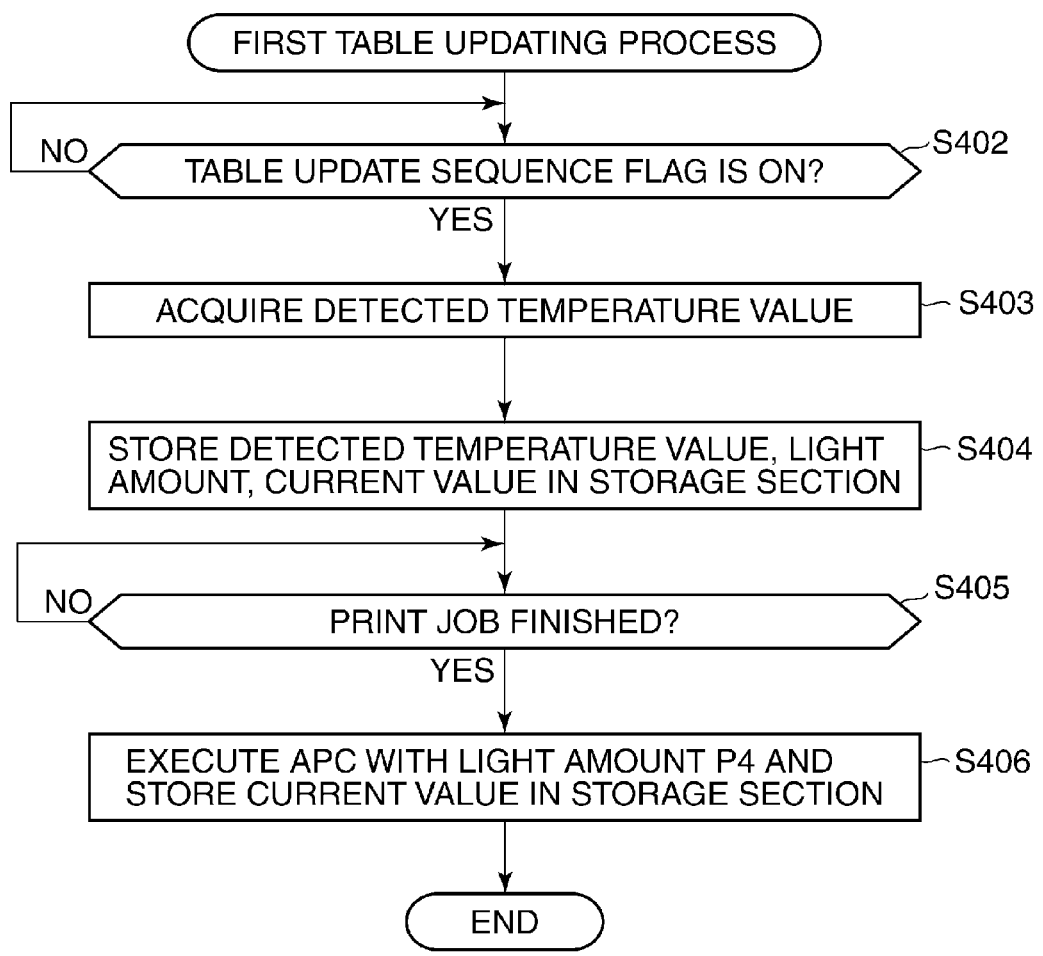
FIG. 4 is a flowchart of a first table update process executed by the image forming apparatus according to the embodiment.

Next, a description will be given of a first table update process with reference to FIG. 4.

The CPU 209 waits (NO to a step S402) until a table update process (sequence) flag is set. The table update process flag is set at timing in which it is regarded that the temperature of the laser emitting device 101 varies, i.e. when a predetermined time elapses after the power of the image forming apparatus has been turned on, or when a predetermined number of printed pages is counted in successive jobs.

If it is determined that the table update process flag has been set (YES to the step S402), the CPU 209 starts the present table update process, and acquires a value of the temperature of the laser emitting device 101 detected by the temperature sensor 110 (step S403). Then, the CPU 209 stores data of the detected temperature value, a current value for driving the laser emitting device 101, and a light amount detection value, in the storage section 208 (step S404).

At this time, more specifically, the CPU 209 calculates a threshold value Th of current at which laser emission is started, in order to determine a bias current value for supplying current to the laser emitting device 101 immediately before the laser emission by taking into account the characteristics of the laser emitting device 101. The CPU 209 further controls current according to a plurality of levels of light amount values to thereby adjust the light amount. For example, the CPU 209 carries out APC at the design maximum light amount APC-H in a light amount range enabling detection of the synchronization timing, and adjusts APC-L light amount corresponding to a fraction of APC-H light amount. In the present table update process, the light amount and current value at APC-H, and the light amount and current value at APC-L are also stored in the storage section 208.

Then, the CPU 209 waits (NO to a step S405) until the print job is finished, and when it is determined that the print job is finished (YES to the step S405), the CPU 209 proceeds to a step S406.

Next, the CPU 209 executes APC for a light amount P4, and stores the light amount, the current value, and the detected temperature value, which are obtained at the time, in the storage section 208 (step S406), followed by terminating the first table update process.

In the above-described table update process, the table update processing operation is started depending on whether or not the table update process flag has been set. However, the table update process may be configured such that the detected temperature value is constantly monitored, and when there has occurred a certain amount of temperature change, the table update process is executed.

Figure 5:
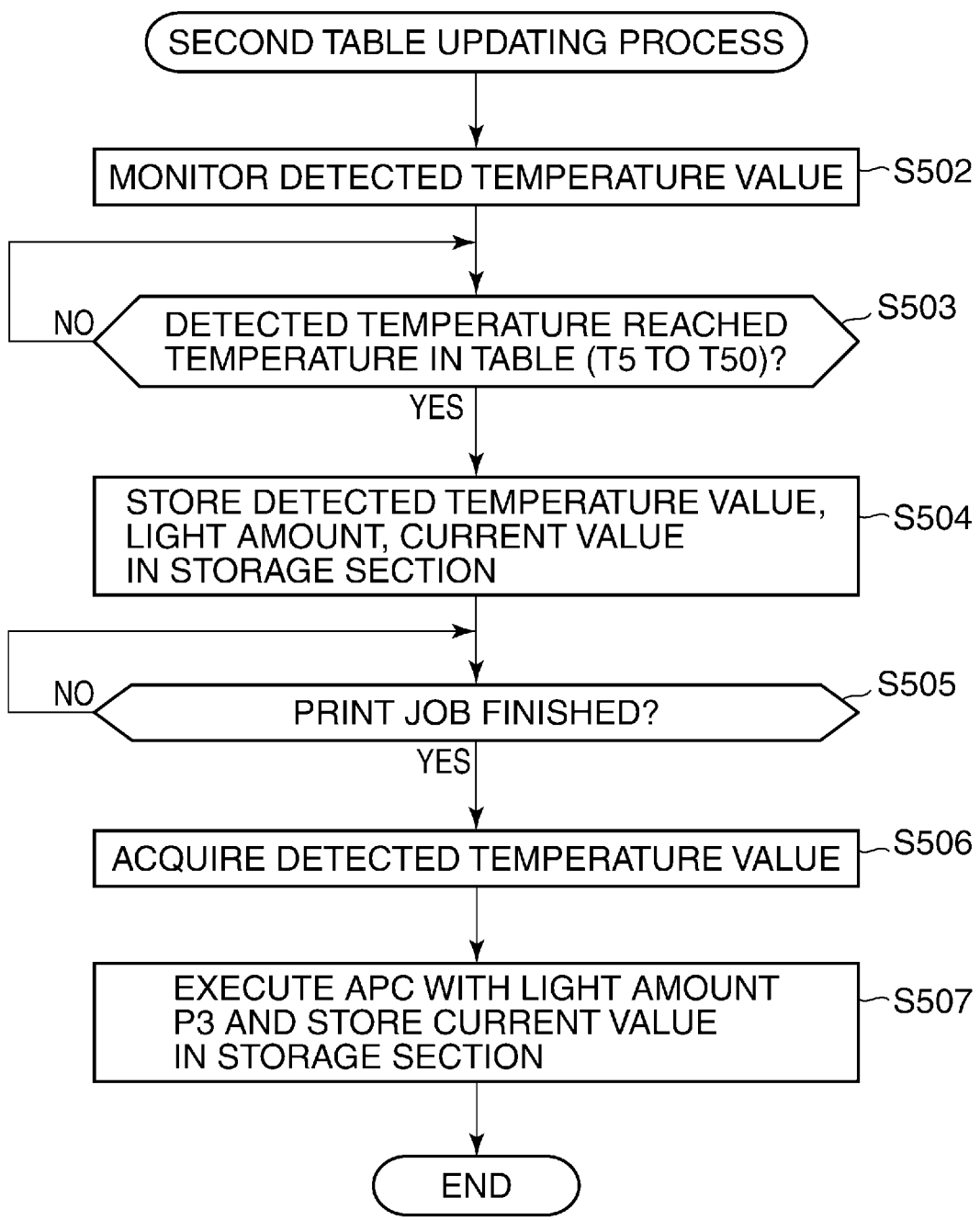
FIG. 5 is a flowchart of a second table update process executed by the image forming apparatus according to the embodiment.

If the table update process is continued as described above, the number of stored values in the table increases according to the number of values of the temperature of the laser emitting device 101. To cope with this, a second table update process is executed in which the detected temperature value monitored and the table is updated. Next, the second table update process will be described with reference to FIG. 5.

The present second table update process is started upon receipt of a command for updating the table. When the present table update process is started, the CPU 209 monitors the detected temperature value (step S502).

Next, the CPU 209 determines whether or not the detected temperature value has reached a temperature value set in the table (step S503). As mentioned hereinbefore, the table is formed of the stored values of the parameters of the temperature, the current value, and the light amount, as shown in FIG. 6. The table shown in FIG. 6 stores, e.g. in association with T5 indicative of a temperature of 5° C., a plurality of combinations (each combination is hereinafter referred to as a record) of input boxes for respective parameter values associated with the temperature. When the temperature at which the light scanning device is usable is within a range between 5° C. and 50° C., the table has a plurality of records associated with each of temperatures T5, T10, . . . , T50 set at intervals of 5° C. Note that what is meant by the expression that the temperature reaches a temperature value set in the table is that when the current temperature is e.g. 34° C., the temperature rises to reach 35° C. (T35).

The CPU 209 waits (NO to the step S503) until the temperature reaches a temperature value set in the table. Then, when it is determined that the temperature has reached a temperature value set in the table (YES to the step S503), the CPU 209 stores the temperature value, the light amount, and the current value at the time, in the storage section 208 (step S504).

Next, the CPU 209 waits (NO to a step S505) until the print job is finished. Then, when it is determined that the print job is finished (YES to the step S505), the CPU 209 acquires a value of the detected temperature (step S506).

Next, the CPU 209 executes APC with the light amount P3, and stores the current value and the light amount at the time, in the storage section 208 (step S507), followed by terminating the second table update process.

As described above, in the second table update process, the table of stored values of the temperature, the current, and the light amount of the laser emitting device 101, is updated within the temperature range where it can be used for user's printing operations. Therefore, even when the temperature has changed, it is possible to correct the current for outputting the light amount required to detect the synchronization timing in a following printing operation, using the updated table. Further, in the present second table update process, it is also possible to cope with aging of the laser emitting device 101.

Figure 7:
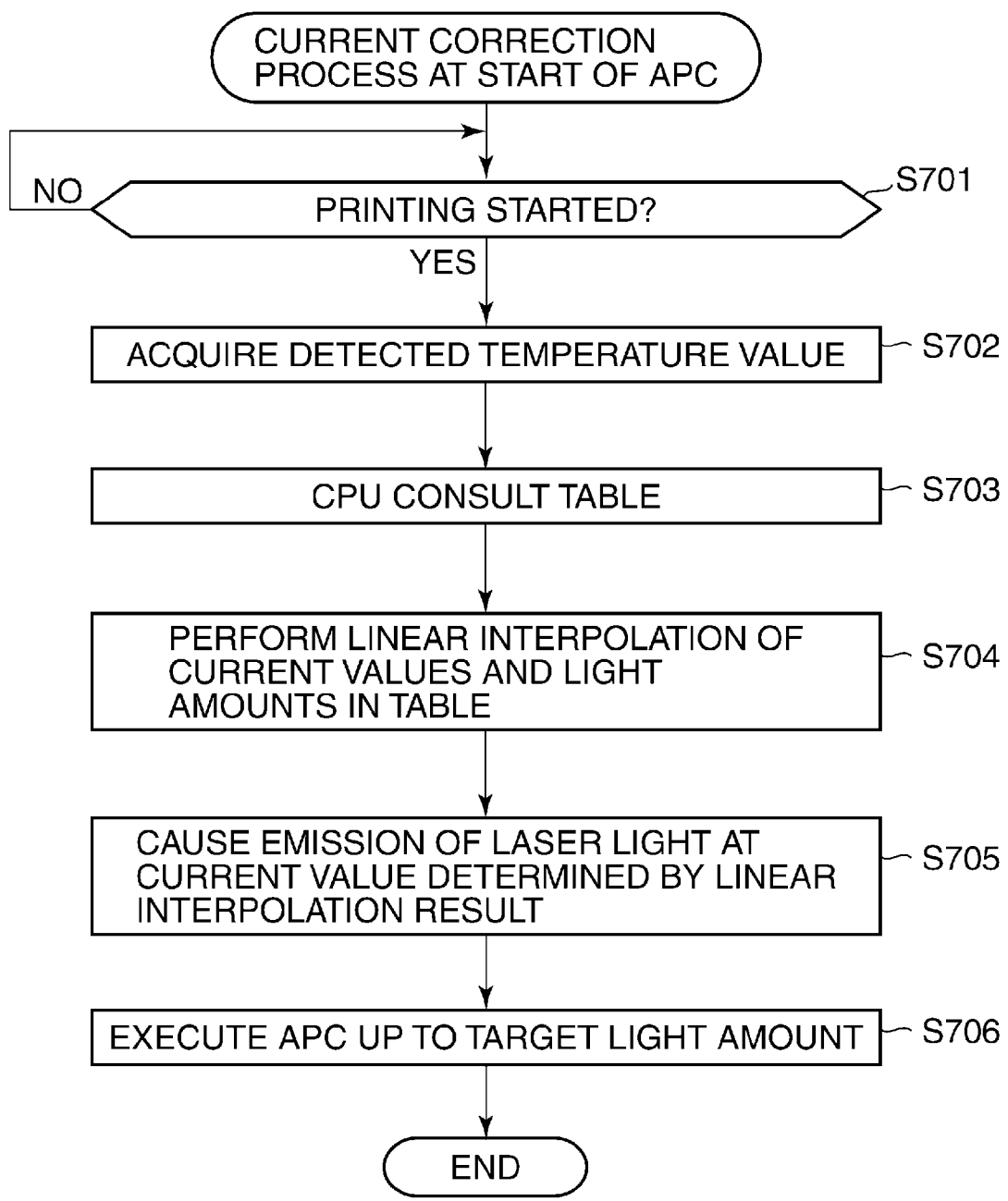
FIG. 7 is a flowchart of a process for determining a laser drive current at the start of APC performed by the image forming apparatus according to the embodiment.

Next, a description will be given, with reference to FIG. 7, of a current correction process for correcting the laser drive current at the start of APC using the table, according to the method of determining the current amount when performing the synchronization timing detection using the above-described table.

The CPU 209 waits until printing is started with processing at the start of APC (NO to a step S701). Then, when it is determined that printing has been started (YES to the step S701), the CPU 209 acquires a value of the temperature of the laser emitting device 101 detected by the temperature sensor 110 at the time (step S702). Let it be assumed here, for example, that the detected temperature is T1. The CPU 209 refers to the table shown in FIG. 6, which is stored in the storage section 208, (step S703) to search for a record corresponding to the temperature T1 detected by the temperature sensor 110.

In the present example, a record associated with the temperature T1 exists in the table shown in FIG. 6, and hence the drive current value is set to the current IT1P1 associated with the light amount P1 shown in FIG. 3. On the other hand, if the detected temperature value is e.g. T3, which does not correspond to a temperature in the table stored in the storage section 208, the current amount and the light amount are interpolated from values adjacent to the detected value in the table (step S704). As the interpolation method, e.g. linear interpolation is employed. For example, when the detected temperature value is T3, which exists between T1 and T2 of the temperature data in the table as shown in FIG. 3, the relationship between the light amount and the current is obtained by linear interpolation to determine the current value of TI3P1. The drive current is thus calculated and determined by interpolating values of the detected temperature value data before or after (on either side of) the detected temperature value, or before and after (on opposite sides of) the detected temperature value, on an as-needed basis.

Next, the CPU 209 causes laser emission to be performed at the current value, determined by interpolation on an as-needed basis, that can drive the laser emitting device 101 to emit laser light with a target light amount sufficient for the light amount sensor 114 to detect the synchronization timing (step S705). Then, the CPU 209 causes APC to be executed up to the target light amount (step S706), followed by terminating the drive current control process for determining the laser drive current at the start of the light amount control.

Next, a description will be given of an example of operation in determining the laser drive current at the start of APC using the table with reference to FIG. 2.

In the image forming apparatus including the light scanning device, when printing is started, the temperature sensor 110 detects the temperature of the laser emitting device 101 at the time, and delivers the detected value to the CPU 209.

Then, the CPU 209 searches for the light amount and the current value corresponding to the temperature at the start of printing from the table stored in the storage section 208. When there is no record associated with the same temperature as that detected by the temperature sensor 110 in the table, the CPU 209 calculates the current value and the light amount e.g. by interpolation, such as linear interpolation. The CPU 209 transmits the determined current value to the current controller 212. Then, the current controller 212 generates a constant current and delivers the generated constant current to the LD driving section 203.

Next, the CPU 209 confirms that the polygon mirror 105 is performing steady rotation, and then controls the laser emitting device 101 to emit laser light to scan on the light amount sensor 114.

When laser scanning light emitted from the laser emitting device 101 is reflected by the mirror 109 and enters the light amount sensor 114, the light amount sensor 114 detects the synchronization timing, and delivers a synchronization timing detection signal to the synchronization signal generator 213. At the same time, the light amount sensor 114 delivers the output of the light amount detection to an analog-to-digital converter 210, and the analog-to-digital converter 210 performs analog-to-digital conversion on the output, and transmits the converted output to the light amount controller 211, thereby causing the same to start processing of the automatic light amount control (APC).

In this APC, in general, the light amount sensor 114 detects the light amount, and a voltage conversion circuit, not shown, converts a current value indicative of the detected light amount, which is output from the light amount sensor 114, to a voltage, or the light amount sensor 114 directly outputs a voltage, whereafter the voltage is amplified for output. Then, the amplified output voltage is fed back via the analog-to-digital converter 210 to the light amount controller 211 that outputs a command (current setting value) for controlling the current to be supplied to the laser emitting device 101 such that the light amount becomes equal to a reference value as a target light amount, to the light amount controller 212.

Next, a description will be given of a flow of the feedback operation at this time with reference to FIG. 2.

In APC, the output value output based on the amount of laser light received by the light amount sensor 114 is subjected to the analog-to-digital conversion by the analog-to-digital converter 210, and is delivered to the light amount controller 211.

The light amount controller 211 having received this output value compares the analog-to-digital converted light amount value with the reference value as the target light amount, and if the light amount value is higher than the reference value, the light amount controller 211 outputs a command for reducing the current value to the current controller 212, whereas if the light amount value is lower than the reference value, the light amount controller 211 outputs a command for increasing the current value.

The current controller 212 has a current source provided therein, and supplies constant current to the LD driving section 203 according to the command from the light amount controller. The LD driving section 203 receives from the synchronization signal generator 213 the synchronization signal which is generated thereby in response to the synchronization timing detection signal from the light amount sensor 114, and is indicative of timing for detecting the light amount next time, and causes the laser emitting device 101 to emit laser light at the current value output from the current controller 212 at the timing. Then, the light amount sensor 114 detects the light amount at a time when the laser light is emitted, and feeds back the detected light amount to the light amount controller 211, so as to control the light amount to the target light amount. Note that this feedback control sometimes takes several scans.

In the present feedback control, synchronization timing has been detected by a first scan, and hence in the next scan, laser light is emitted only at timing in which scanning on the light amount sensor 114 is performed based on the immediately preceding synchronization signal. This makes it possible to restrict the scanning of the laser light for the synchronization timing detection only to the first scan.

Figure 8:
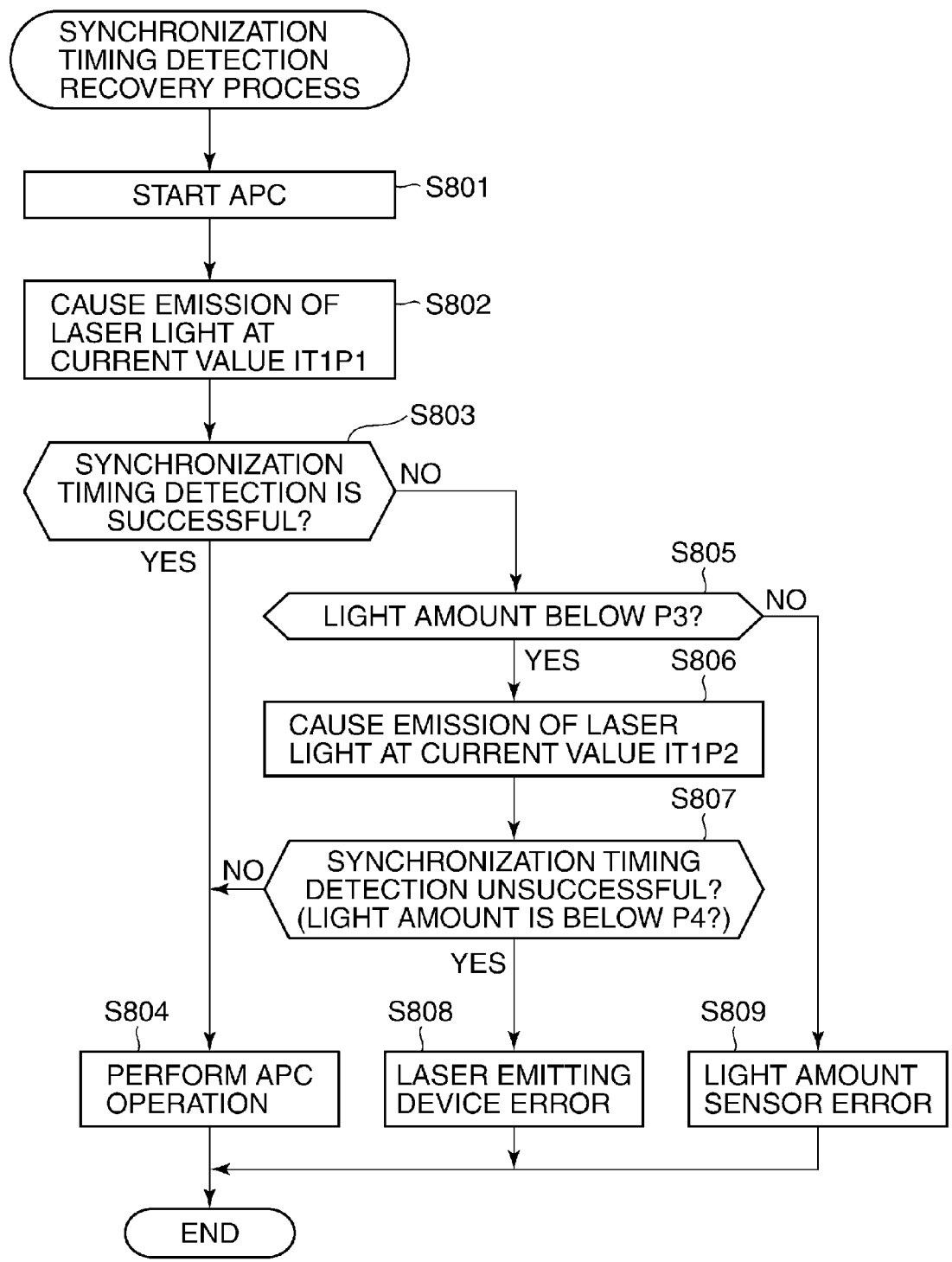
FIG. 8 is a flowchart of a synchronization timing detection recovery process executed when synchronization timing detection by the light scanning device according to the embodiment is unsuccessful.

Next, a description will be given of a synchronization timing detection recovery process with reference to FIG. 8, which is executed in a case where a recovery operation is performed because the synchronization timing could not be detected when laser light is emitted at the current value determined by the CPU 209.

In the synchronization timing detection recovery process shown in FIG. 8, a case where the detected temperature value is T1 will be described by way of example. In the synchronization timing detection recovery process shown in FIG. 8, it is assumed that a case can occur in which the scanning synchronization timing cannot be detected from an amount of light emitted when the current value of IT1P1 is supplied to the laser emitting device 101, targeting the light amount of the value P1 between the light amounts P2 and P3.

The present synchronization timing detection recovery process is started at the start of print processing. When the synchronization timing detection recovery process is started, the CPU 209 starts APC (step S801). Then, the CPU 209 causes the laser emitting device 101 to emit laser light by setting the current value output from the current controller 212 to TI1P1 (step S802).

Next, the CUP 209 determines whether or not the synchronization timing detection is successful, and if it is determined that the synchronization timing detection is successful because the output from the light amount sensor 114 is within the range of the synchronization timing detection level (YES to a step 803), the CPU 209 proceeds to a step S804.

Then, the CPU 209 starts APC at the current value of IT1P1 (step S804). In doing this, the CPU 209 may start APC from APC-H or from APC-L. Thereafter, the CPU 209 terminates the present synchronization timing detection recovery process.

On the other hand, if it is determined in the step S803 that the synchronization timing detection is unsuccessful because the output from the light amount sensor 114 is outside the range of the synchronization timing detection level (NO to the step S803), the CPU 209 proceeds to a step S805.

In the step S805, the CPU 209 determines whether or not the output from the light amount sensor 114 at that time is below the light amount P3. Then, if it is determined that the output is not below P3 (NO to the step S805), the CPU 209 judges that the failure of the synchronization timing detection is caused not by the excessive or insufficient light amount, but by an error of the light amount sensor 114 (step S809). Thereafter, the CPU 209 terminates the present synchronization timing detection recovery process.

On the other hand, if it is determined that the output is below P3 (YES to the step S805), the CPU 209 causes the laser emitting device 101 to emit laser light at the current value of IT1P2 at which the light amount becomes larger than that at IT1P1 (step S806).

Next, the CPU 209 determines whether or not the synchronization timing can be detected with the light amount at this time (whether or not the output from the light amount sensor 114 is below the light amount P4) (step S807). If it is determined that the synchronization timing can be detected (NO to the step S807), the CPU 209 proceeds to a step S804 to execute the following APC operation.

Further, if it is determined that the synchronization timing detection is unsuccessful because the light amount is below P4 (YES to the step S807), the CPU 209 outputs an error because a failure of the laser emitting device 101 is suspected (step S808). Thereafter, the CPU 209 terminates the present synchronization timing detection recovery process.

As described above, according to the present synchronization timing detection recovery process, even when the synchronization timing detection at the start of the printing operation is unsuccessful, the laser is lit with another light amount stored in the table, which enables the synchronization timing detection to be performed earlier than a case where APC is sequentially performed from a low light amount, and execute APC. Further, in the present synchronization timing detection recovery process, although APC may be started from the current value of IT1P1 associated with the light amount P1, as described above, it may be started from the current value of IT1P3 associated with the light amount P3 (APC-L).

The description of the image forming apparatus including the light scanning device according to the present embodiment has been given assuming that one set of typical data items have been stored in the table before factory shipment. However, in the present image forming apparatus, a table of values of the average temperature, current, and light amount of the laser emitting device 101, in which data items of T5 to T50 have been written as shown in FIG. 6 may be stored. Further, as for correction of variation in the values of the table by an individual product of the laser emitting device 101, the values can be sequentially updated in the above-described second table update process shown in FIG. 5.

In short, the light scanning device which deflects and scans laser light emitted from the laser emitting device 101, which is provided in the image forming apparatus according to the present embodiment, includes the light amount sensor 114 for detecting the light amount of laser light being scanned. The light amount sensor 114 is disposed at such a location where the light amount sensor 114 receives a spot of laser light scanned, by the polygon mirror 105 for main scanning, across a predetermined position corresponding to an area (non-image area) outside the image formation area on the exposed surface of the photosensitive drum 111. Although in the present embodiment, the description has been given of the arrangement in which the laser light is reflected by the reflective mirror 109 to cause the same to enter the light amount sensor 114, the arrangement may be such that the laser light directly enters the light amount sensor 114. In this case, the arrangement can be simplified by omitting the reflective mirror 109.

Further, the present light scanning device detects laser scanning synchronization timing by the output from the light amount sensor 114. The present light scanning device includes the temperature sensor 110 for outputting a detected temperature value obtained by directly or indirectly detecting the temperature of the laser emitting device 101. For the temperature sensor 110, there may be employed a temperature sensor, such as a thermistor, which is generally and widely used.

The present light scanning device includes the storage section 208 which stores the data of the relationship between the detected temperature of the laser emitting device 101, the value of current supplied to the laser emitting device 101, and the light amount, in a rewritable manner.

The present light scanning device further includes the current controller 212 which outputs current for controlling the amount of light emitted from the laser emitting device 101, and a light amount-determining unit, implemented by the CPU 209, which calculates and determines the drive current to be output when the current controller 212 starts the light amount control. Note that a current control unit defined in appended claims corresponds to a combination of the light amount-determining unit implemented by the CPU 209 and the current controller 212.

In the present light scanning device, the light amount-determining unit reads the data on the detected temperature value of the light emitting element 205, the current value, and the light amount from the storage section 208. The read data on the detected temperature value, the current value, and the light amount are checked against the detected temperature value detected by the temperature sensor 110.

Then, the drive current for driving the laser emitting device 101 is calculated, which can cause the same to emit light with a light amount sufficient for the light amount sensor 114 to perform synchronization timing detection at the start of the light amount control, according to the detected temperature value detected by the temperature sensor 110. The value of the drive current calculated as mentioned above is output to the current controller 212.

The current controller 212 drives the laser emitting device 101, based on the received drive current value, such that light is emitted with the light amount which enables the synchronization timing detection for APC. This enables in the light scanning device to rapidly perform the scanning synchronization timing detection and rapidly perform initial automatic light amount control.

In the light scanning device according to the present embodiment, the scanning synchronization timing detection is executed by supplying IT1P1 as the current value targeting the light amount of the value of P1 between P2 and P3 shown in FIG. 3, to the laser emitting device 101.

More specifically, to determine the light amount of P1, first, the light amount-determining unit detects the APC-H light amount (P2) as the light amount maximum value for the automatic light amount control required by design. Along with this, the light amount-determining unit detects the temperature of the laser emitting device 101 by the temperature sensor 110.

Next, the light amount-determining unit detects the APC-L light amount as the light amount minimum value for the automatic light amount control which corresponds to a predetermined fraction of P2 (APC-H light amount), with reference to the temperature of the laser emitting device 101 detected by the temperature sensor 110. Note that the APC-L light amount as the light amount minimum value for the automatic light amount control is larger than the minimum light amount P4 from which the synchronization timing can be detected, by a predetermined amount.

Next, the light amount-determining unit determines the light amount P1 for the synchronization timing detection, which is relatively determined e.g. by proportional distribution at a value between the APC-H light amount as the light amount maximum value for the automatic light amount control and the APC-L light amount as the light amount minimum value for the automatic light amount control. Note that the light amount P1 for the synchronization timing detection is determined with reference to the temperature of the laser emitting device 101 detected by the temperature sensor 110.

Further, the light amount-determining unit determines e.g. the current value IT1P1 for outputting the light amount P1 for the synchronization timing detection at the temperature T1 with reference to the data of the current value, the detected temperature value, and the light amount stored in the storage section 208. Then, the light amount-determining unit causes the determined current value IT1P1 to be supplied to the laser emitting device 101 to thereby cause the light amount sensor 114 to perform the scanning synchronization timing detection.

To perform the scanning synchronization timing detection as described above, the light amount-determining unit sets conditions of the target amount of light emitted by the laser emitting device 101 at the start of the laser scanning as follows:

The first condition is that the target light amount is not larger than the APC-H light amount as the light amount maximum value required by design and is not smaller than the minimum light amount from which the synchronization timing can be detected.

When the target light amount is set to an amount not larger than the APC-H light amount (P2) as the light amount maximum value required by design, it is possible to prevent the light amount-determining unit from supplying an excessive drive current to the vertical surface emitting laser emitting device 101 at the start of the scanning synchronization timing detection. Therefore, by setting the target light amount as mentioned above, it is possible to avoid an inconvenience caused by flow of the excessive drive current into the vertical surface emitting laser emitting device 101.

Further, when the target light amount is set to an amount not smaller than the minimum light amount P4 which enables the synchronization timing detection, the light amount sensor 114 as the light amount sensor 114 positively receives the laser light emitted from the laser emitting device 101 from the start of the scanning synchronization timing detection. Therefore, when the target light amount is set as mentioned above, it is possible to detect the rotational state of the polygon mirror 105 immediately after the start of the scanning synchronization timing detection, and hence it is possible to properly execute the control for driving the polygon mirror 105.

Note that when the light amount sensor 114 has not received the laser light emitted from the laser emitting device 101 at the start of the scanning synchronization timing detection, it is sometimes erroneously judged that the rotational speed of the polygon mirror 105 is low. In such a case, the control for increasing the rotational speed of the polygon mirror 105 is carried out, whereby the polygon mirror 105 is rotated at an excessively high speed, which may cause an inconvenient.

To prevent the above-mentioned inconvenience, by setting the target light amount to an amount not smaller than the minimum light amount P4 which enables the synchronization timing detection, it is possible to prevent the polygon mirror 105 from being rotated at an excessively high speed.

Further, the second condition is that the target light amount is set to an amount as close as possible to the APC-H light amount (P2) as the light amount maximum value.

When the target light amount is set as mentioned above, the light amount sensor 114 detects a value of the target light amount close to the APC-H light amount (P2) as the light amount maximum value. In this case, there is a small difference between the detected value of the target light amount and the value of the APC-H light amount (P2) as the light amount maximum value. Therefore, the light amount-determining unit can execute the control for adjusting the light amount output from the laser emitting device 101 to the APC-H light amount (P2) as the light amount maximum value in a relatively short time by progressively increasing the value of the drive current from the value of the target light amount.

Particularly, the present light scanning device 100 is configured such that the light amount sensor 114 receives the laser light only at a location (non-image area) outside the image area where the main scanning is started. For this reason, the light amount sensor 114 receives the laser light only once during one main scan.

Therefore, after receiving one output from the light amount sensor 114, the light amount-determining unit waits for one main scan to be completed, and then receives the next output. That is, the light amount sensor 114 intermittently outputs the light amount detection values each time after the lapse of a time period for one main scan, which causes the light amount-determining unit to wait so long in performing the light amount control.

To cope with this, when the light amount control is performed, the difference between the value of the target light amount and the value of the APC-H light amount (P2) as the light amount maximum value is reduced to thereby reduce the range of the light amount varied by the light amount control. This makes it possible to cause the value of the light amount to reach from the value of the target light amount to the value of the APC-H light amount (P2) as the light amount maximum value in a short time.

In the light amount sensor 114 using the conventional half mirror, the laser light reflected by the half mirror constantly enters the light amount sensor, and hence there is no waiting time in the control operation. Therefore, even when there is a large difference between the value of the target light amount and the value of the APC-H light amount (P2) as the light amount maximum value, it is possible to complete the light amount control in a relatively short time.

On the other hand, in the present light amount-determining unit, as described above, a time required to execute the light amount control is reduced by making the value of the target light amount close to the value of the APC-H light amount (P2) as the light amount maximum value.

Further, the present light scanning device 100 is configured such that the laser light from the laser emitting device 101 directly enters the light amount sensor 114, or the low-cost reflective mirror 109 as an all-reflective mirror is used. Therefore, the present light scanning device 100 can be manufactured at low costs because the high-cost half mirror is not used.

Further, if the half mirror is used, there causes a large error e.g. in a reflection ratio of the half mirror, which increases an error also in the detection result from the light amount sensor 114. However, in the present light scanning device 100, the light amount sensor 114 directly receives the laser light, which makes it possible to detect the light amount with high accuracy because an error of the half mirror is not contained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-014041, filed Jan. 26, 2011, which is hereby incorporated by reference herein in its entirety.

What is claimed is:

1. A light scanning device that forms an electrostatic latent image on a photosensitive member by deflecting laser light emitted from a laser emitting device such that the laser light scans on the photosensitive member in a predetermined direction, comprising:

a light receiving unit disposed on a scanning line of the laser light, for receiving the laser light;

a temperature detecting unit configured to detect a temperature of the laser emitting device or an inside of the light scanning device;

a storage unit configured to store data indicative of a relationship between the temperature, drive current to be supplied to the laser emitting device, and a light amount of the laser light; and a current control unit configured to control the drive current to be supplied to the laser emitting device based on the temperature detected by said temperature detecting unit and the data stored in said storage unit, such that an output level of an output from said light receiving unit responsive to receipt of the laser light at the start of scanning of the laser light is not lower than a predetermined output level at which timing of emission of the laser light can be controlled, and is not higher than an output level corresponding to a maximum allowable amount of the laser light to be emitted by the laser emitting device, wherein the data stored in said storage unit comprises a plurality of data items each indicative of a relationship between the drive current to be supplied to the laser emitting device and the light amount, the plurality of data items being associated with a plurality of temperature values, respectively, wherein said current control unit selects, from the plurality of data items, a data item associated with a temperature value closest to a value of the temperature detected by said temperature detecting unit, and controls the drive current to be supplied to the laser emitting device based on the value of the temperature detected by said temperature detecting unit and the selected data item, wherein said current control unit controls the light amount to a target light amount, and in controlling the light amount to the target light amount, said current control unit determines values of the drive currents in association with a plurality of different values of the target light amount, respectively, and starts drive current control with a lower one of the plurality of different values of the target light amount, and wherein when the light amount control is started with the lower value of the target light amount, if the output level of the output from said light receiving unit responsive to receipt of the laser light is lower than the predetermined output level, said current control unit performs the light amount control using a higher one of the plurality of different values of the target light amount than the lower value of the target light amount.

2. The light scanning device according to claim 1, wherein the plurality of data items stored in said storage unit are updated by being rewritten based on data of respective values of the temperature of the laser emitting device detected when forming the electrostatic latent image on the photosensitive member based on image data, the drive current to be supplied to the laser emitting device, and the light amount, which are obtained as a result of execution of updating processing.

3. The light scanning device according to claim 1, wherein when determining the drive current to be supplied to the laser emitting device by calculation, said current control unit determines whether there is a data item associated with the value of the temperature detected by said temperature detecting unit in the plurality of data items stored in said storage unit, and if there is no such a data item, said current control unit calculates a value of the drive current value by interpolation based on respective data items associated with temperature values adjacent to the value of the temperature detected by said temperature detecting unit, and controls the drive current to be supplied to the laser emitting device based on the calculated drive current value.

4. The light scanning device according to claim 3, wherein the interpolation is linear interpolation.

5. The light scanning device according to claim 1, wherein said current control unit sets the target light amount such that the target light amount becomes closer to a maximum value of the light amount required by design.

6. An image forming apparatus comprising:
a laser emitting device configured to emit laser light;
a photosensitive member configured to have an electrostatic latent image formed thereon by the laser light emitted from said laser emitting device; and
a light scanning device configured to form the electrostatic latent image on said photosensitive member by deflecting the laser light emitted from said laser emitting device such that the laser light scans on said photosensitive member in a predetermined direction, wherein said light scanning device comprises:
a light receiving unit disposed on a scanning line of the laser light, for receiving the laser light;
a temperature detecting unit configured to detect a temperature of the laser emitting device or an inside of the light scanning device;
a storage unit configured to store data indicative of a relationship between the temperature, drive current to be supplied to the laser emitting device, and a light amount of the laser light; and
a current control unit configured to control the drive current to be supplied to the laser emitting device based on the temperature detected by said temperature detecting unit and the data stored in said storage unit, such that an output level of an output from said light receiving unit responsive to receipt of the laser light at the start of scanning of the laser light is not lower than a predetermined output level at which timing of emission of the laser light can be controlled, and is not higher than an output level corresponding to a maximum allowable amount of the laser light to be emitted by the laser emitting device, wherein the data stored in said storage unit comprises a plurality of data items each indicative of a relationship between the drive current to be supplied to the laser emitting device and the light amount, the plurality of data items being associated with a plurality of temperature values, respectively, wherein said current control unit selects, from the plurality of data items, a data item associated with a temperature value closest to a value of the temperature detected by said temperature detecting unit, and controls the drive current to be supplied to the laser emitting device based on the value of the temperature detected by said temperature detecting unit and the selected data item, wherein said current control unit controls the light amount to a target light amount, and in controlling the light amount to the target light amount, said current control unit determines values of the drive currents in association with a plurality of different values of the target light amount, respectively, and starts drive current control with a lower one of the plurality of different values of the target light amount, and wherein when the light amount control is started with the lower value of the target light amount, if the output level of the output from said light receiving unit responsive to receipt of the laser light is lower than the predetermined output level, said current control unit performs the light amount control using a higher one of the plurality of different values of the target light amount than the lower value of the target light amount.

\* \* \* \* \*